United States Patent [19]
Lee

[11] 4,108,956
[45] Aug. 22, 1978

[54] INJECTION MOLDING METHOD AND APPARATUS

[75] Inventor: Soo-Il Lee, Toledo, Ohio

[73] Assignee: Owens-Illinois, Inc., Toledo, Ohio

[21] Appl. No.: 761,095

[22] Filed: Jan. 21, 1977

[51] Int. Cl.² .............................. B29F 1/03; B29F 1/08
[52] U.S. Cl. .................................... 264/329; 425/547; 425/562; 425/572
[58] Field of Search ............... 425/243, 245, 247, 251, 425/562, 563, 564, 565, 566, 567, 568, 547, 549; 264/328, 329

[56] References Cited

U.S. PATENT DOCUMENTS

| 2,300,759 | 11/1942 | Amigo ................................ 425/247 |
| 2,456,423 | 12/1948 | Jobst ................................ 425/243 X |
| 3,741,704 | 6/1973 | Beasley .............................. 425/245 |
| 3,918,870 | 11/1975 | Tetzlaff ............................. 425/251 |

FOREIGN PATENT DOCUMENTS

| 983,224 | 2/1976 | Canada ................................. 425/245 R |
| 1,948,455 | 4/1971 | Fed. Rep. of Germany ...... 425/245 R |
| 2,320,346 | 11/1974 | Fed. Rep. of Germany ...... 425/245 R |

Primary Examiner—Francis S. Husar
Assistant Examiner—William R. Briggs
Attorney, Agent, or Firm—Richard D. Heberling; M. E. Click; D. H. Wilson, Jr.

[57] ABSTRACT

This disclosure relates to both a method and apparatus for forming injection molded articles in a molding assembly which includes a heated runner housing adjacent a cooled mold. In a first disclosed embodiment, a slidable gate valve having a supply passageway is interposed between and in contact with both the cooled mold and heated runner. A layer of insulation material is included on the slidable gate valve to thermally segregate the differential temperature zones of the mold and runner. In a second embodiment, an axially reciprocable pin valve selectively opens and closes a passageway between a heated runner housing and a cooled mold to regulate the flow of plastic material. An annular sleeve of insulation material is telescoped over a portion of the pin valve to likewise thermally segregate the runner and mold.

15 Claims, 6 Drawing Figures

INJECTION MOLDING METHOD AND APPARATUS

BACKGROUND OF THE INVENTION

1. Field of the Invention

This invention generally relates to an injection molding method and apparatus, and more particularly to a gate valve arrangement which includes insulation to thermally segregate a heated runner housing from an adjacent cooled mold cavity.

2. The Prior Art

Various valving arrangements have been proposed in the prior art for regulating the flow of heated thermoplastic material from a heated runner housing to the sprue passageway of a cooled mold assembly. For the most part, the prior art includes two primary types of valving arrangements: (1) a slidable gate valve, shown for example by U.S. Pat. Nos. 3,288,903, 3,799,723, 3,787,159, 3,387,324 and 3,694,529; and (2) an axially reciprocal pin valve shown for example by U.S. Pat. Nos. 3,023,458, 3,530,539, 2,878,515, and 3,296,353.

Typical problems in this area of technology have included drool from the sprue passageway, cold slugs formed in the runner system as a result of heat being lost by conduction to the cooled mold assembly, and warm spots in the mold assembly due to heat conduction, causing longer cycle time to assure complete curing of the molded part.

Other problems exist due to the nature of certain plastic materials. For example, polyethylene terephthalate, being readily crystallizable when cured and solidified, is sensitive to nonuniformly cooled molds and to bushing designs where the sprue opening is too small, causing strong shear fields in the material.

Prior attempts to solve these problems have not been totally successful. For example, U.S. Pat. No. 3,741,704 discloses the use of insulation material between a cooled mold and a heated runner housing, but does not prevent the conduction of heat between these two mold assembly parts through the gate valve. Other patents such as 2,928,125 and 3,579,620 generally disclose the use of insulation but not in the context of the present invention.

The present invention overcomes all the previously discussed prior art problems by effectively utilizing insulating material in conjunction with valving structure to thermally separate the heated and cooled zones in the injection molding process.

SUMMARY OF THE INVENTION

The present invention relates to two principal embodiments, yet includes several independent aspects in both the method and apparatus.

In one of the broader apparatus aspects, the invention relates to an injection molding assembly including cooled mold sections adjacent a heated runner system. The improvement resides in a valving arrangement for selectively establishing fluid communication between a delivery port in the runner and an injection port in the mold to accommodate the flow of heated plastic material. The valve includes insulation to thermally segregate the cooled mold from the heated runner, thereby eliminating the problems experienced in the prior art.

In one of the embodiments, the valve is comprised of a slidable gate interposed between and in contact with both the cooled mold and the heated runner, the slidable gate including a layer of heat conductive material adjacent the mold and a layer of insulation adjacent the runner. A supply passageway is provided in the slidable gate for selective alignment with both the mold injection port and the delivery port of the runner.

In a second embodiment, the valve is comprised of a pin valve which is axially reciprocable in alignment with a delivery port in the runner. The tip of the pin valve is formed of a heat conductive material and a portion adjacent the tip is formed of insulation material to thermally segregate the heated plastic material in the runner from the cooled mold sections. Optionally, the pin valve may include peripheral, spaced grooves to receive heated material from the mold cavity as the pin valve is axially reciprocated toward the injection port of the mold. Separate heating means in the runner are selectively activated to heat the plastic material trapped in the grooves prior to a subsequent injection cycle.

In the first of the preferred embodiments, the method includes injecting heated, flowable plastic material under pressure from a delivery port in a heated runner housing, through a flow passageway in a slidable gate valve, and into a sprue opening of an internal mold cavity of a cooled mold assembly. Next, the slidable gate valve, which is interposed between and in contact with both the runner housing and the cooled mold assembly and which includes a layer of insulating material, is displaced to shut off the flow of plastic material from the runner to the injection cavity. While the plastic material is cooled in the mold, additional plastic material is maintained in a heated, flowable condition in the runner. Although the two differentially heated mold components are immediately adjacent, they are thermally separated by the layer of insulating material on the slidable gate valve.

In the second embodiment, the method includes injecting heated, flowable plastic material under pressure from a delivery port in a runner housing into a sprue opening of an internal mold cavity of a cooled mold. Next, an essentially cylindrical pin valve is axially displaced into the delivery port in the heated runner housing to block the flow of plastic material, the pin valve including an insulated portion which is at least partially displaced into the delivery port. Again, while the plastic material in the mold is being cooled, additional plastic material in the runner is maintained in a heated, flowable condition, yet the two differentially heated mold components are thermally separated by the insulating material on the axially reciprocal pin valve.

These aspects of the present invention exhibit particular utility when molding plastic articles from crystalline material, such as polyethylene terephthalate. Such crystalline materials are particularly sensitive to thermal heterogeneity in the mold which will result in a morphology difference in various portions of the molded article. For example, when polyethylene terephthalate parisons are injection molded with conventional hot runner systems, a whitened crystallized portion is formed at the bottom of the parison adjacent the sprue opening.

Accordingly, the present invention provides the following advantages not previously enjoyed in the prior art: (1) the elimination of heat transfer between a hot runner housing and a cooled mold assembly; (2) the ability to uniformly cool the molded part; (3) the ability to reduce cycle time, since heat sinks are avoided in the mold assembly; (4) flexibility in tool and product designs; (5) the ability to avoid stresses in the molded part generated as a result of previously necessary small sprue passageways which were utilized to reduce heat transfer; (6) the elimination of cold slugs in the heated runner; and (7) the ability to achieve substantial thermal homogeneity throughout a crystalline injection molded product.

These and other meritorious features and advantages of this invention will be more fully appreciated from the following detailed description and the appended claims.

DETAILED DESCRIPTION OF THE PREFERRED EMBODIMENTS

Figure 1:
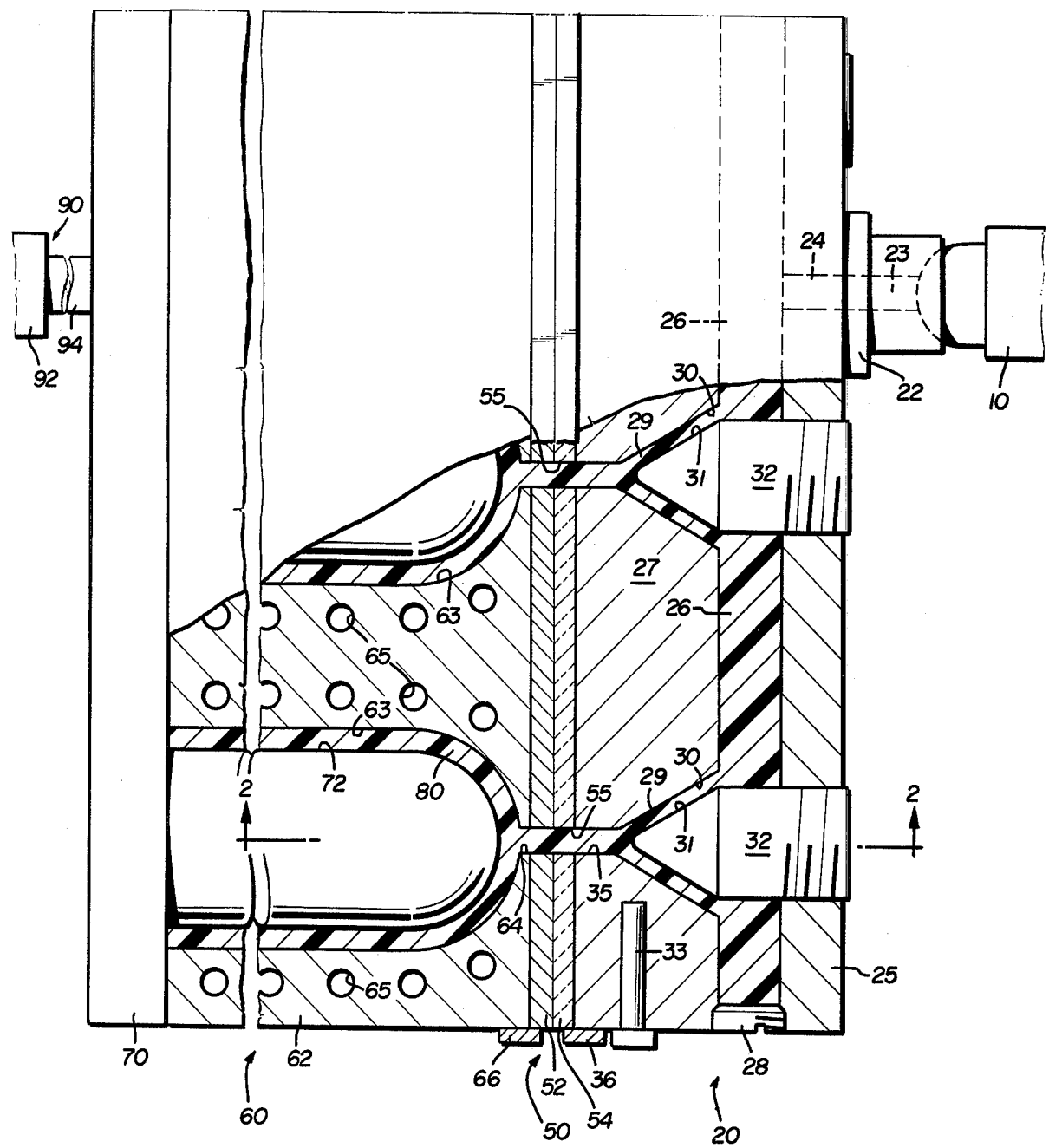
FIG. 1 is a sectional top plan view of a mold assembly and heated runner housing in accordance with one embodiment of this invention.
Figure 2:
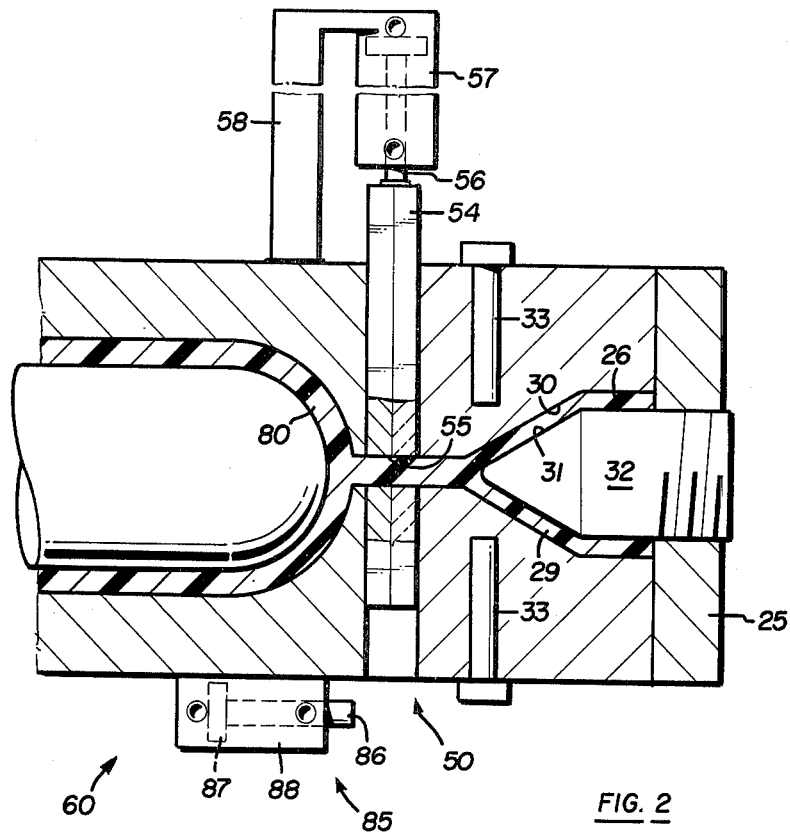
FIG. 2 is a side elevational view taken along plane 2—2, as shown in FIG. 1.
Figure 3:
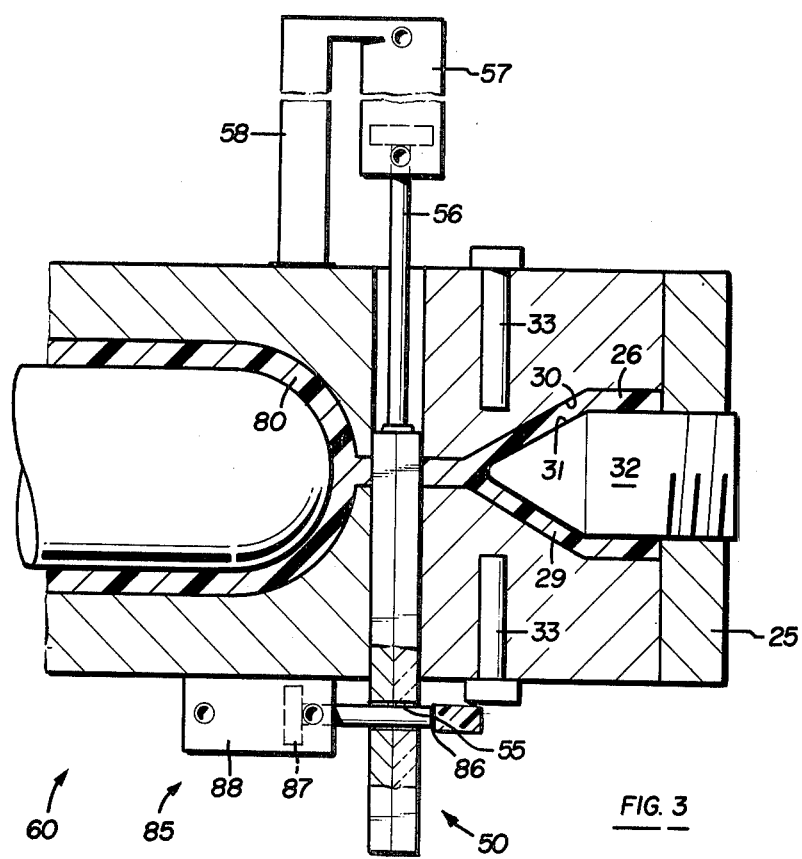
FIG. 3 is a side plan view, similar to FIG. 2, but illustrating the slidable gate valve displaced to a closed position where a cold slug is removed from the flow passageway.
Figure 4:
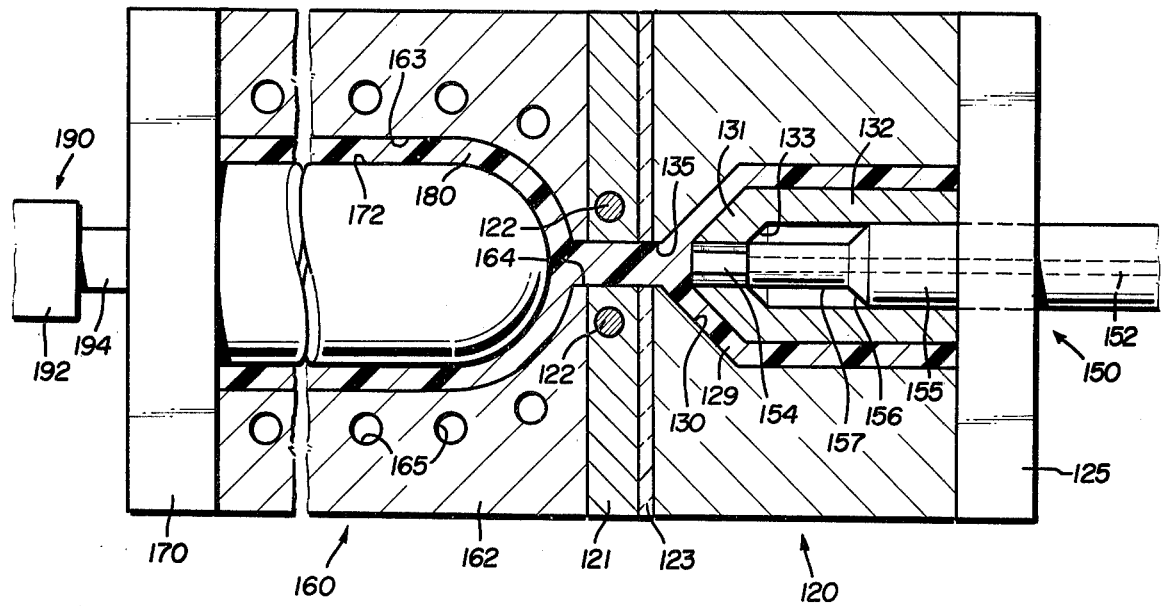
FIG. 4 is a side plan view illustrating a mold assembly and heated runner housing in accordance with a second embodiment of this invention.
Figure 5:
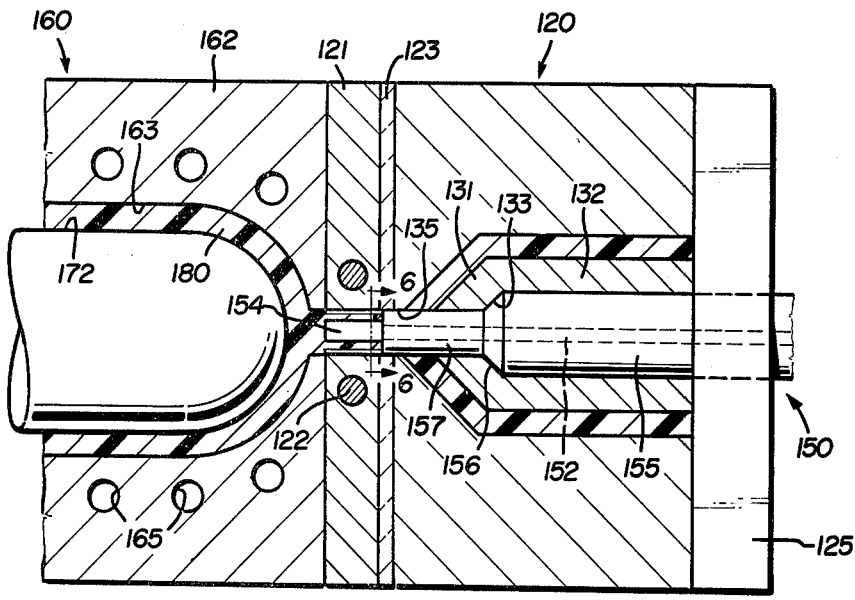
FIG. 5 is a side elevational view similar to FIG. 4, but illustrating the axially reciprocal pin valve of this invention displaced to a position to block fluid communication between the runner and mold and to thermally segregate the mold and the runner housing.
Figure 6:
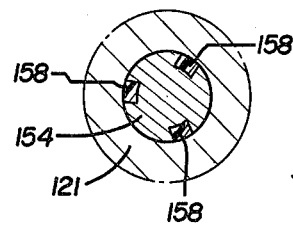
FIG. 6 is a sectional view taken along plane 6—6 as shown in FIG. 5, illustrating optional grooves provided in the end portion of the reciprocal pin valve.

The present invention relates to two principal embodiments for minimizing and preferably eliminating heat transfer between a heated runner housing and a cooled mold. The first of these embodiments is illustrated in FIGS. 1–3 and includes a slidable gate valve. The second of these embodiments is shown in FIGS. 4–6 and includes an axially reciprocal pin valve.

The Embodiment of FIGS. 1–3

Referring more particularly to the drawings, FIG. 1 illustrates an injection head or plasticizer 10 for supplying flowable, heated plastic material to a heated runner housing 20. The plasticizer 10 may be of any conventional design, such as a reciprocable rotary screw or plunger type. In accordance with the invention of this embodiment, a slidable gate valve 50 selectively establishes communication between the heated runner housing 20 and internal mold cavities in a cooled mold assembly 60.

The heated runner housing includes an injection bushing 22 having a sprue opening 23 which communicates with an opening 24 in a forward plate 25 of the runner housing. A primary transverse runner line 26 is formed between the forward plate 25, a rear plate 27 and an end plate 28, the primary branch line 26 supplying flowable, heated plastic material to a plurality of branch runner lines 29. These branch runner lines are defined by conical surfaces 30 machined into the rearward plate 27 and essentially complementary shaped conical end surfaces 31 on cylindrical bushings 32 which are threadedly received in openings in the forward housing plate 25. An essentially cylindrical opening 35 provides a delivery passageway for supplying flowable, heated plastic material from the runner housing into the mold assembly 60 by way of the slidable gate valve 50. The runner housing is maintained in a heated condition by appropriate heating cartridges or calrod heaters, which are represented by reference numerals 33.

The slidable gate valve 50 includes a plurality of essentially cylindrical openings 55, which are selectively aligned with both delivery ports 35 and 64 respectively in the runner housing 20 and mold assembly 60. The selective displacement of the gate valve 50 is accomplished by a hydraulic cylinder and piston arrangement, which is illustrated in FIGS. 2 and 3. More specifically, a piston rod 56 is suitably secured to the top of the slidable gate valve 50 and is displaced by fluid under pressure within either a hydraulic or pneumatic cylinder 57. A mounting bracket 58 is secured to a female mold section 62 to support the cylinder 57. As illustrated in FIG. 1, guide tabs 66 and 36 are respectively secured to the female mold section 62 and runner housing 30 to guide the slidable gate valve during its displacement.

In accordance with this invention, the slidable gate valve 50 is interposed between and in contact with both the heated runner housing 20 and the cooled mold assembly 60. The slidable gate valve 50 includes a layer of heat conductive material 52, such as stainless steel. Affixed to the layer of stainless steel 52 is a layer of insulation material 54 which may be comprised of any suitable material that will achieve the primary object of this invention, namely to thermally segregate the differentially heated zones in the molding arrangement. A suitable material for use as the insulating layer 54 includes a glass-ceramic sold by Corning Glass Works under the Trademark Macor.

As will be appreciated by those skilled in the art, when the slidable gate valve 50 is displaced from its position shown in FIGS. 1 and 2, a slug of plastic material will be trapped within the passageway 55. Since this slug will be cooled during the cooling cycle of the material within the mold cavity 80, its removal is required prior to a subsequent injection shot. Accordingly, a knock-out pin assembly 85 is secured to the female mold section 62, as illustrated in FIGS. 2 and 3. The knock-out pin assembly includes a piston rod 86 which is reciprocated by a piston 87 within a hydraulic or pneumatic cylinder 88. Although only one such knock-out pin assembly is shown in FIGS. 2 and 3, the assembly will include an appropriate number corresponding to the number of injection molding cavities and passageways 55 in the slidable gate assembly 50.

The molding assembly 60 includes a female mold section 62 having a plurality of molding surfaces 63. A sprue or delivery port 64 is provided for each mold cavity to receive plastic material from the heated runner housing 20. The female mold section 62 is maintained at a desired temperature, for example by internal ducts 65, through which a cooling fluid is circulated.

A male mold section includes a reciprocal platen 70 which carries a plurality of elongated core pins 72 that are telescopically insertable within the female mold section to define an essentially tubular molding cavity 80. Likewise, the core pins 72 may be cooled by internal passageway as is conventional. The platen 70 is displaced by a conventional power means 90, which includes a fluid-operated cylinder and piston 92 and 94, respectively.

In operation, heated, flowable plastic material is supplied to the heated runner housing 20 by the injection head 10. With the slidable gate valve 50 positioned as shown in FIGS. 1 and 2, the plastic material will flow from the runner assembly into the internal mold cavities of the mold assembly 60 by way of the gate valve passageways 55. Upon filling the mold cavities 80, cylinder 57 is actuated to displace piston rod 56 and gate valve 50 from the position shown in FIG. 2 to the position shown in FIG. 3. Next, cylinders 88 are actuated to displace piston rods 86 into flow passageways 55 to knock-out the slug of plastic material. During this operation, the plastic material within the mold cavities is cooled by fluid circulated through ducts 65, and simultaneously, the plastic material within the runner housing 20 is maintained in a heated, flowable condition by appropriate heaters 33. In accordance with this invention, the layer of insulation 54 segregates and insulates these two different temperature zones of the molding assembly to provide the advantages which have been previously discussed. Because the layer of heat conductive material 52 contacts the cooled mold assembly, it likewise is cooled and assists in cooling the plastic material in the region of the mold delivery port 64.

After the plastic material within the mold cavities 80 has been sufficiently cooled, cylinder 92 is actuated to displace piston rod 94 and platen 70 away from the fixed female mold section 62 to withdraw core pins 72 and the molded articles thereon from the internal mold cavities. The tubular molded articles are then appropriately stripped from the core pins and the platen is displaced to telescopically insert the core pins back into the internal mold cavities. After rods 86 are retracted from within passageways 55, the slidable gate valve 50 is raised by piston rod 56 to the position shown in FIG. 2, and a subsequent shot of plastic material is delivered to the internal mold cavities from the heated runner housing.

The Embodiment of FIGS. 4-6

Referring now to FIG. 4, a heated runner housing 120 is illustrated as including a forward plate 125 which receives flowable thermoplastic material from an injection head (not shown) in essentially the same manner as disclosed and described in the embodiment shown in FIGS. 1-3. In this assembly, however, a hollow bushing 132 is threadedly received in the forward plate 125 and includes a conical end surface 131 at its remote end. A complementary shaped conical surface 130 of the runner housing 120, in conjunction with the conical surface 131, defines a branch runner line passageway 129. A cylindrical opening 135 in the runner housing extends from the conical surface 130 to define a flow passageway from the branch runner line into the internal mold cavity of a molding assembly 160. As in the prior embodiment, the runner housing 120 will include suitable heating cartridges (not shown).

The mold assembly 160 of this embodiment may be essentially identical to that disclosed and described in connection with the embodiment of FIGS. 1-3. That is, the mold assembly will include a female mold section 162 having a plurality of internal molding surfaces 163 which are interconnected with a sprue opening or material delivery port 164. The female mold section 162 is similarly cooled by ducts or passageways 165, through which cooling fluid is circulated. Similarly, the male molding section includes a reciprocal platen 170 having core pins 172 secured thereto, with the press platen 170 being reciprocated by a hydraulic or pneumatic ram 190 consisting of a cylinder 192 and a piston rod 194.

In this embodiment, the flow of heated plastic material from the runner housing 120 to the mold assembly 160 is regulated by an axially reciprocal pin valve 150, which is telescopically reciprocal within the tubular bushing 132. Reciprocal movement of the pin valves may be effected by conventional means (not shown), such as illustrated in U.S. Pat. Nos. 2,878,515 or 3,530,539, incorporated by reference.

The pin valve 150 includes an elongated, cylindrical, metallic member 152 integral with an enlarged head 154, having a size and configuration conforming essentially to that of passageway 135. An insulating sleeve 155 is telescoped over elongated rod portion 152, and includes a reduced end portion 157 having a diameter essentially the same as the enlarged head portion 154. An optional feature of the insulating sleeve includes a frusto conical tapering portion 156 which is complementary shaped to an internal frusto-conical surface 133 of the hollow bushing 132. As shown in FIG. 5, surfaces 133 and 156 abut to define the extent of axial projection of the pin valve into the flow passageway 135 in order to halt the flow of plastic material from the runner housing into the mold cavity. As in the prior embodiment, sleeve 155 may be formed of any suitable insulating material, such as that sold by Corning Glass Works under the Trademark Macor.

In operation, heated, flowable plastic material is injected into the runner housing 120 from a suitable injection head, with the plastic material flowing through the runner lines into flow passageway 135 and into the mold cavity 180 of the mold assembly 160. When the mold cavity 180 is filled, the pin valve 150 is axially displaced from the position shown in FIG. 4 to the position shown in FIG. 5 to block the flow of plastic material and to initiate the curing cycle of the material within the mold cavity. With the pin valve positioned as shown in FIG. 5, the enlarged heat-conductive head 154 is cooled by the mold assembly, in order to facilitate the cooling of the plastic material in the mold cavity in the region of injection portion 164. Further, the insulating sleeve closes the branch runner line 129 so that heat from the runner housing 120 is not conducted to the mold cavity by the valving assembly, thus achieving the advantages elaborated upon in the earlier portions of this disclosure. After the plastic material within the mold the mold cavity 180 has been thermally cured, platen 170 is retracted and the molded parts are stripped from the core pins 172. Then, the core pins are telescopically reinserted into the mold cavity. Next, pin valve 150 is retracted to allow the flow of heated plastic material from the runner housing 120 into the mold assembly 160.

As shown in FIG. 6, the enlarged, heat conductive head 154 may optionally include peripherally spaced grooves 158. As will be appreciated, when the pin valve 150 is displaced into flow passageway 135, pressure will be built up within the molding cavity 180. The grooves 158 therefore provide passageways for excessive plastic material to flow back into the heated runner housing. Preferably, these grooves will not extend into the insulation sleeve 156 so that passageway 135 will be blocked from the branch runner line 129 when the pin valve is positioned as shown in FIG. 5.

In this arrangement, the plastic material trapped within the grooves 158 becomes cooled and at least partially solidified while the material in the mold cavity 180 is being cured. Accordingly, an optional runner segment 121 may include electrical resistance heaters 122 which are selectively energized prior to retracting the pin valve from the position of FIG. 5 to the position of FIG. 4, in order to remelt the plastic material in grooves 158.

Further, an optional layer of insulation material 123 may be interposed between plate 121 and the remaining portion of the runner housing; so that heat is not conducted from the runner lines to the cooled mold. As shown in FIG. 5, the optional layer of insulating material 123 and the insulation sleeve 156 collectively define an insulation barrier to thermally segregate the heated runner region from the cooled portion of the mold assembly.

It is to be understood that the foregoing description is exemplary of the present invention. Various modifications may be made to the disclosed arrangement and yet still achieve the overall object of this invention, to thermally segregate the heated runner from the cooled mold segments. For example, in the embodiment of FIGS. 1-3, the insulation and heat conductive layers may be reversed. Alternatively, the layer of insulation material may be rigidly connected to the runner housing and include a plurality of flow passageways aligned with the branch runner lines. In the embodiment of FIGS. 4-6, the tip of the axially reciprocal pin valve could be comprised of insulation material.

Further, although the foregoing description has been directed primarily to a heated runner housing and a cooled mold cavity, the invention may be used with equal success with a mold that is heated to cure thermosetting plastic material.

I claim:

1. In an injection molding assembly: a heated runner housing having a sprue opening to receive plasticized material under pressure from an injection head, a plurality of branch runner lines, and a transverse runner cavity interconnecting the sprue opening with the branch runner lines; a cooled mold assembly adjacent the heated runner housing, the mold assembly including mold sections defining a plurality of mold cavities, with each cavity having an injection port in alignment with the branch runner lines of the heated runner housing, the improvement of: a composite, laminated, slidable gate valve interposed between the cooled mold assembly and the heated runner housing, said laminated valve including a thermally conductive layer contacting the mold assembly and a thermally insulating layer contacting the runner housing, the gate valve having a plurality of openings formed therethrough which are selectively positioned in alignment with the branch runner lines and the injection ports to establish communication therebetween to accommodate the flow of heated plastic material from the heated runner housing into the cooled mold assembly, displacement means selectively moving the slidable gate valve to align the valve openings with the branch lines and mold injection ports and to displace the valve openings from such alignment to block the flow of plastic material into the mold cavities; the composite gate valve being effective to thermally segregate the cooled mold cavity from the adjacent heated runner housing in order to (1) facilitate the cooling of the molded article, (2) reduce cycle time, and (3) prevent the formation of a cold plastic slug in the runner housing.

2. The molding assembly as defined in claim 1 further including knock-out pins positioned adjacent to the path of said valve to be respectively insertable into each of the valve openings upon their displacement from alignment with the mold injection ports and branch lines in order to remove slugs of plastic material therefrom, and means displacing the knock-out pins into and out of the valve openings.

3. An injection molding assembly, comprising:
   mold sections defining an internal injection mold cavity and an injection port;
   means thermally conditioning the mold sections;
   supply means adjacent the mold sections and having a delivery port for injecting heated, flowable plastic material under pressure through the mold injection port into the mold cavity; and
   means heating the supply means to maintain the plastic material in a heated, flowable condition, with the supply means being maintained at a temperature different from that of the mold sections;
   the improvement of:
   displaceable valve means interposed between said delivery port and said injection port, means displacing said valve means for selectively establishing fluid communication between the delivery port of the supply means and the injection port of the mold to accommodate the flow of heated plastic material therethrough, said valve means including an insulation portion adjacent the delivery port to thermally segregate the mold cavity from the heated supply means and a thermally conductive portion adjacent the injection port in heat exchange relation with the mold sections.

4. The injection molding assembly as defined in claim 3, characterized by said valve means being comprised of a slidable gate valve interposed between and in contact with both the mold and the supply means, the slidable gate including a layer of heat conductive material adjacent the mold sections and a layer of insulation adjacent the supply means, and a supply passageway through the slidable gate for selective alignment with both the mold injection port and the delivery port of the supply means.

5. The injection molding assembly as defined in claim 3, characterized by said valve means including an elongated, essentially cylindrical pin valve axially reciprocable in alignment with said delivery port in the delivery means, said pin valve having a tip formed of heat conductive material and a portion adjacent the tip formed of insulation material to thermally segregate the heated plastic material in the supply means from the mold sections.

6. The injection molding assembly as defined in claim 5, characterized by said pin valve having peripheral, spaced grooves to receive heated material from the mold cavity as the pin valve is axially reciprocated toward the injection port of the mold to block the flow of plastic material.

7. The injection molding assembly as defined in claim 6, characterized by said supply means including separate heating means adjacent the delivery port, said separate heating means being selectively activated to heat the plastic material trapped in the grooves of the pin valve.

8. The injection molding assembly as defined in claim 7, characterized by said supply means being segmented, wherein a first segment includes runner passageways and a second segment includes the separate heating means and the delivery port, and further including a layer of insulating material interposed between said first and second segments; the thermally conductive tip of said pin valve being thermally segregated from said first segment collectively by the insulation on the pin valve and the insulation between said segments when the tip is displaced into the delivery port to block fluid communication between the supply means and the mold cavity.

9. In an injection molding assembly: a heated runner housing having a sprue opening to receive plasticized material under pressure from an injection head, a plurality of branch runner lines, and a transverse runner cavity interconnecting the sprue opening with the branch runner lines; a cooled mold assembly adjacent the heated runner housing, the mold assembly including mold sections defining a plurality of mold cavities with each cavity having an injection port in alignment with the branch runner lines of the heated runner housing; the improvement of: a composite, laminated, slidable gate valve interposed between and in contact with both the cooled mold assembly and the heated runner housing, the gate valve having a plurality of openings formed therethrough which are selectively positioned in alignment with the branch runner lines and the injection ports to establish communication therebetween to accommodate the flow of heated plastic material from the heated runner housing into the cooled mold assembly; displacement means selectively moving the slidable gate valve to align the valve openings with the branch lines and mold injection ports and to displace the valve openings from such alignment to block the flow of plastic material into the mold cavities; and said gate valve being laminated of a layer of thermally conductive material contacting said cooled mold assembly and a layer of insulating material contacting the heated runner housing, said laminated valve being effective to thermally segregate the differential temperature zones of said mold assembly and said runner housing.

10. The injection molding assembly as defined in claim 9, characterized by said layer of insulating material being rigidly interconnected with and carried by the slidable gate valve.

11. In an injection molding assembly: a heated runner housing having a sprue opening to receive plasticized material under pressure from an injection head, a plurality of branch runner lines, and a transverse runner cavity interconnecting the sprue opening with the branch runner lines; a cooled mold assembly adjacent the heated runner housing, the mold assembly including mold sections defining a plurality of mold cavities, with each cavity having an injection port in alignment with the branch runner lines of the heated runner housing; the improvement of: a plurality of reciprocal pin valves guided by the runner housing and axially aligned with each injection port, said valves each being axially movable into respective branch runner lines to block the flow of heated plastic material from the runner housing into the mold cavities, each pin valve including an elongated rod portion and an enlarged tip portion enterable into each port and comprised of a heat conductive material, and a sleeve comprised of insulation material telescoped over at least a portion of the elongated rod portion adjacent the enlarged tip to minimize heat transfer between the heated runner housing and the cooled mold in order to (1) facilitate the cooling of the molded article, (2) reduce cycle time, and (3) prevent the formation of a cold plastic slug in the runner housing.

12. In a method of forming a plastic article by injection molding, the steps of:
(a) injecting heated, flowable plastic material under pressure from a delivery port in a heated runner housing, through a flow passageway in a composite slidable gate valve, and into a sprue opening of an internal mold cavity of a cooled mold assembly, the slidable gate valve being interposed between the heated runner housing and the cooled mold assembly, and said composite valve comprising a layer of insulating material contacting the heated runner housing and a layer of heat conductive material contacting the cooled mold assembly;
(b) displacing the slidable gate valve in a direction essentially perpendicular to the direction of plastic flow from the runner housing to the mold cavity thereby displacing the flow passageway in the gate valve out of alignment with the delivery port and the sprue opening to block plastic flow;
(c) simultaneously (i) cooling the plastic material within the mold cavity and (ii) heating additional plastic material within the runner housing; and
(d) during the performance of steps (a)-(c), (i) thermally segregating the adjacent heated runner housing and the cooled mold assembly by use of the insulating material layer of the slidable gate valve and (ii) cooling the material in the sprue opening by the conductive material layer of the slidable gate valve.

13. In the method as defined in claim 12, further including the step of incidentally forming a slug of material in the flow passageway of the gate valve during the performance of Step (b) and removing the slug from the flow passageway during the performance of Step (c) by inserting a rod into the passageway.

14. In a method of forming a plastic article by injection molding, the steps of:
(a) injecting heated, flowable plastic material under pressure from a delivery port in a heated runner housing into a sprue opening of an internal mold cavity in a cooled mold assembly;
(b) axially displacing an essentially cylindrical pin valve into the delivery port in the heated runner housing to block the flow of plastic material from the runner housing to the mold, the pin valve including an insulated portion which is at least partially displaced into the delivery port during this step, and displacement of the valve inserting the insulated portion into said delivery port;
(c) simultaneously (i) cooling the plastic material within the mold cavity and (ii) heating additional plastic material within the runner housing; and
(d) during the performance of Steps (a)-(c), thermally segregating the adjacent heated runner housing from the cooled mold assembly at least partially by the insulated portion on the pin valve to (i) facilitate the cooling of the molded article, (ii) reduce cycle time, and (iii) prevent the formation of a cold plastic slug in the runner housing.

15. The method as defined in claim 14, wherein the pin valve includes a groove in its end portion, characterized in Step (b) by plastic material being trapped within the groove; and further including the Steps of: incidentally cooling the plastic material in the groove during the performance of Step (c); removing the plastic article from the mold cavity; heating the plastic material in the groove; and retracting the pin valve from the delivery port to accommodate the flow of plastic material from the runner housing into the mold cavity for the formation of an additional plastic article.

* * * * *